(12) United States Patent
Cho (10) Patent No.: US 8,605,038 B2
(45) Date of Patent: Dec. 10, 2013

(54) TOUCH SCREEN PANEL TYPE LIQUID CRYSTAL DISPLAY

(75) Inventor: Jong-Whan Cho, Ansan-si (KR)

(73) Assignee: Samsung Display Co., Ltd., Yongin (KR)

( * ) Notice: Subject to any disclaimer, the term of this patent is extended or adjusted under 35 U.S.C. 154(b) by 697 days.

(21) Appl. No.: 12/269,347

(22) Filed: Nov. 12, 2008

(65) Prior Publication Data

US 2009/0146945 A1 Jun. 11, 2009

(30) Foreign Application Priority Data

Dec. 7, 2007 (KR) ........................ 10-2007-0126732

(51) Int. Cl.
G09G 3/36 (2006.01)

(52) U.S. Cl.
USPC ........... 345/173; 345/104; 345/156; 345/174; 345/178; 345/179; 178/18.01; 178/18.06; 463/37

(58) Field of Classification Search
USPC ................ 345/172–179, 156, 159, 102, 104; 349/12, 122, 162; 359/613; 178/18.01–18.06; 463/37–38
See application file for complete search history.

(56) References Cited

U.S. PATENT DOCUMENTS

| 6,760,086 B2 * | 7/2004 | Hattori et al. ................. 349/122 |
|---|---|---|
| 7,268,770 B1 * | 9/2007 | Takahata et al. .............. 345/173 |
| 2004/0189920 A1 * | 9/2004 | Hsieh et al. .................... 349/141 |
| 2006/0030384 A1 * | 2/2006 | Yoshizawa et al. ............... 463/7 |
| 2007/0097278 A1 * | 5/2007 | Rho et al. ......................... 349/12 |
| 2007/0268243 A1 * | 11/2007 | Choo et al. .................... 345/104 |
| 2008/0062147 A1 * | 3/2008 | Hotelling et al. ............. 345/174 |
| 2008/0130122 A1 * | 6/2008 | Egi et al. ....................... 359/613 |
| 2008/0158178 A1 * | 7/2008 | Hotelling et al. ............. 345/173 |
| 2008/0165139 A1 * | 7/2008 | Hotelling et al. ............. 345/173 |
| 2009/0096760 A1 * | 4/2009 | Ma et al. ....................... 345/174 |
| 2009/0127003 A1 * | 5/2009 | Geaghan .................... 178/18.03 |

FOREIGN PATENT DOCUMENTS

| JP | 05019233 | | 1/1993 |
|---|---|---|---|
| JP | 2003196023 | | 7/2003 |
| JP | 2006-023904 | * | 1/2006 |
| JP | 2006023904 | | 1/2006 |

* cited by examiner

*Primary Examiner* — Lun-Yi Lao
*Assistant Examiner* — MD Saiful A Siddiqui
(74) *Attorney, Agent, or Firm* — H.C. Park & Associates, PLC (57) ABSTRACT

A liquid crystal display includes an upper substrate, a lower substrate, and a liquid crystal layer interposed between the upper substrate and the lower substrate. The upper substrate includes a first insulating substrate, a transparent conductive layer on the first insulating substrate, and a first polarizer on the transparent conductive layer. The lower substrate includes a second insulating substrate, a second polarizer on the second insulating substrate, and a thin film transistor layer. The second insulating substrate is between the thin film transistor layer and the second polarizer. The transparent conductive layer allows an electric field to be formed on the first polarizer, so that a position signal input unit, which contacts the first polarizer, is capacitively coupled with the transparent conductive layer.

17 Claims, 6 Drawing Sheets

TOUCH SCREEN PANEL TYPE LIQUID CRYSTAL DISPLAY

CROSS-REFERENCE TO RELATED APPLICATION

This application claims priority from and the benefit of Korean Patent Application No. 10-2007-0126732, filed on Dec. 7, 2007, which is hereby incorporated by reference for all purposes as if fully set forth herein.

BACKGROUND OF THE INVENTION

1. Field of the Invention

The present invention relates to a liquid crystal display. More particularly, the present invention relates to a capacitive touch screen panel type liquid crystal display that may have a thin panel and improved light transmittance and visibility.

2. Discussion of the Background

Currently, with the development of information technologies, the demand for a high-performance display, which displays and transmits various types of information including images, graphics, and characters, has increased. To satisfy this demand, the display industry has rapidly grown.

A liquid crystal display may have low power consumption and may be light-weight and slim as compared with a cathode-ray tube. In addition, a liquid crystal display has made remarkable advances over the years as a next-generation display device that does not emit harmful electromagnetic waves. In order to satisfy the demand for high-definition digital broadcasting, the liquid crystal display has been spotlighted together with a plasma display panel having a large (30 inches or more) screen.

The liquid crystal display is a display apparatus, in which liquid crystals having a mesomorphic phase with both liquid and solid properties are injected between two substrates and the alignment of the liquid crystals is controlled by an electric field formed between electrodes disposed on the two substrates, respectively, to display images having a set brightness. Liquid crystal displays are widely used for electronic clocks, electronic calculators, personal computers, and televisions.

Recently, touch screen panel type liquid crystal displays, which are obtained by integrating a touch screen panel with a liquid crystal display, have been extensively used as in-vehicle display devices. A touch screen panel is an apparatus that allows a user to operate a system by touching a transparent surface installed on an upper part of a display screen using a pen or a finger. A resistive touch screen panel is widely used because it is advantageous in terms of cost and precision. However, since the resistive touch screen panel has a dual structure including a film and a glass, the resistive touch screen panel may have low light transmittance and a narrow effective screen area as compared with other touch screen panels. In addition, since the resistive touch screen panel may cause a short by closely adhering the film to the glass, the resistive touch screen panel may have a narrow operational temperature range and inferior aging characteristics. In addition, the resistive touch screen panel may be thick, may have decreased light transmittance, and may have reduced product yield due to difficulty in controlling alien substances.

SUMMARY OF INVENTION

The present invention provides a capacitive touch screen panel type liquid crystal display that may be thin and may have improved light transmittance and visibility.

Additional features of the invention will be set forth in the description which follows, and in part will be apparent from the description, or may be learned by practice of the invention.

The present invention discloses a touch screen panel type liquid crystal display including an upper substrate, a lower substrate, a liquid crystal layer, and a signal detection unit. The upper substrate includes a first insulating substrate, a transparent conductive layer on the first insulating substrate, and a first polarizer on the transparent conductive layer. The lower substrate includes a second insulating substrate, a second polarizer on the second insulating substrate, and a thin film transistor layer. The second insulating substrate is between the thin film transistor layer and the second polarizer. The liquid crystal layer is between the upper substrate and the lower substrate. The signal detection unit detects a contact point of a position signal input unit when the position signal input unit, which contacts the first polarizer, is capacitively coupled to the transparent conductive layer.

The present invention also discloses a touch screen panel type liquid crystal display including an upper substrate, a lower substrate, a liquid crystal layer, and a signal detection unit. The upper substrate includes a first insulating substrate, a first polarizer on the first insulating substrate, and a transparent conductive layer. The first insulating substrate is between the transparent conductive layer and the first polarizer. The lower substrate includes a second insulating substrate, a second polarizer on the second insulating substrate, and a thin film transistor layer. The second insulating substrate is between the thin film transistor layer and the second polarizer. The liquid crystal layer is between the upper substrate and the lower substrate. The signal detection unit detects a contact point of a position signal input unit when the position signal input unit, which contacts the first polarizer, is capacitively coupled to the transparent conductive layer.

The present invention also discloses a touch screen panel type liquid crystal display including a liquid crystal display panel, a transparent polymer layer, a transparent conductive layer, an overcoat layer, and a signal detection unit. The transparent polymer layer is on the liquid crystal display panel. The transparent conductive layer is on the transparent polymer layer. The overcoat layer is on the transparent conductive layer and includes a transparent insulating material. The signal detection unit detects a contact point of a position signal input unit when the position signal input unit, which contacts the overcoat layer, is capacitively coupled to the transparent conductive layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to," or "coupled to" another element or layer, it can be directly on, directly connected to, or directly coupled to the other element or layer or intervening elements or layers may be present. In contrast, when an element is referred to as being "directly on," "directly connected to," or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a touch panel type liquid crystal display according to an exemplary embodiment of the present invention will be described with reference to FIG. 1 and FIG. 2.

Figure 1:
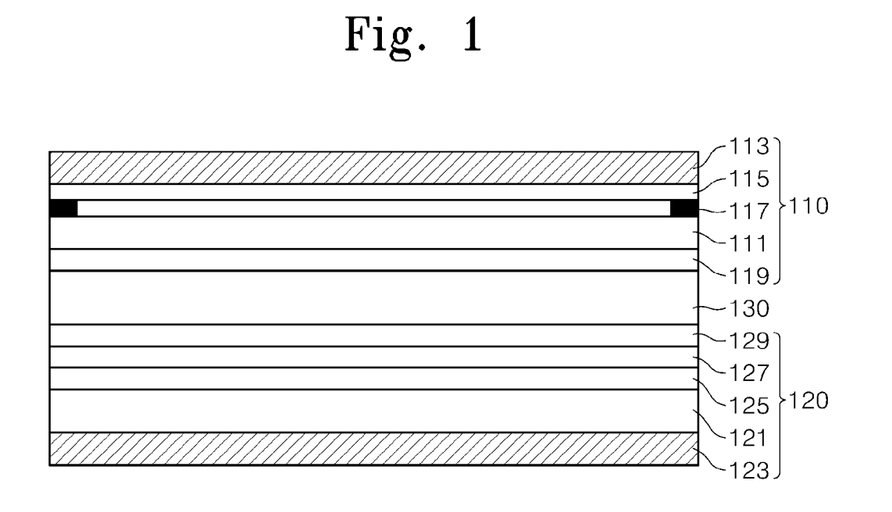
FIG. 1 is a sectional view showing a touch screen panel type liquid crystal display according to an exemplary embodiment of the present invention.

FIG. 1 is a sectional view showing a touch screen panel type liquid crystal display according to an exemplary embodiment of the present invention. FIG. 2 is a view showing an operational principle of the touch screen panel type liquid crystal display according to an exemplary embodiment of the present invention.

The liquid crystal display includes an upper substrate 110, a lower substrate 120, and a liquid crystal layer 130 between the upper and lower substrates 110 and 120. The liquid crystal display does not require an additional touch screen panel because the upper substrate 110 may serve as the touch screen panel.

The upper substrate 110 includes a first insulating substrate 111, which may be made of glass or transparent polymer material, a transparent conductive layer 115 formed on the first insulating substrate 111, and a first polarizer 113 formed on the transparent conductive layer 115.

The transparent conductive layer 115 may include indium tin oxide (ITO), indium zinc oxide (IZO), or a mixture of ITO and IZO, and the transparent conductive layer 115 may be formed through sputtering or chemical vapor deposition (CVD). In an analog type liquid crystal display, the transparent conductive layer 115 may be formed on the entire surface of the first insulating substrate 111, and in a digital type liquid crystal display, a conductive layer pattern may be formed such that a touch signal can be selectively detected.

The first polarizer 113 may include a polyvinyl alcohol (PVA) film and a triacetyl cellulose (TAC) film. The first polarizer 113 serves as a touch sensor and has a polarizing function. This is because the first polarizer 113 serves as a dielectric layer that forms a parasitic capacitance in cooperation with a position signal input unit such as a pen or a finger.

Figure 2:
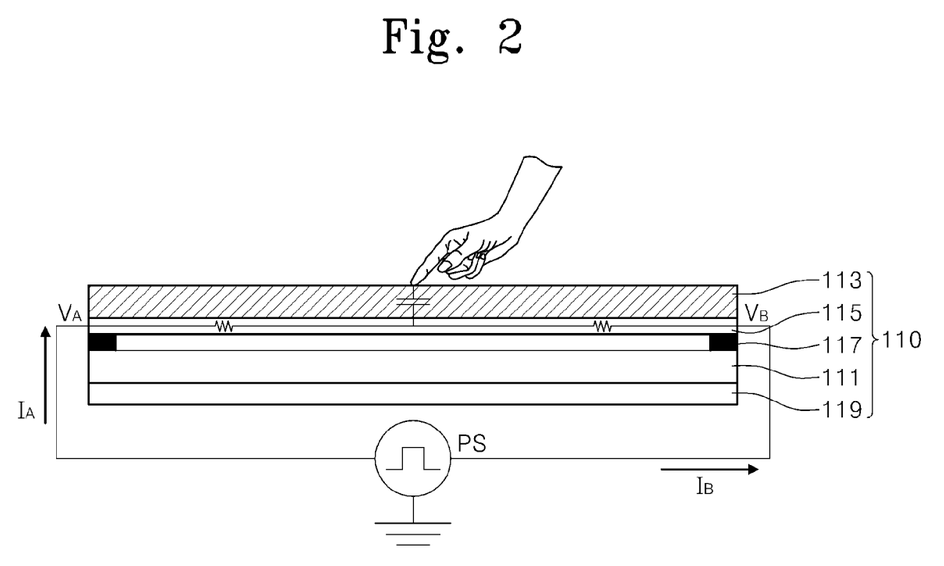
FIG. 2 is a view showing an operational principle of the touch screen panel type liquid crystal display according to the exemplary embodiment of FIG. 1.

As shown in FIG. 2, if a position detection signal (current) is applied to the transparent conductive layer 115, a uniform electric field is formed on the first polarizer 113. At this time, if the position signal input unit, such as a pen or a finger, contacts the first polarizer 113, electric charges charged in the parasitic capacitance are absorbed by the position signal input unit, so that the electrical load is changed at a contact point P where the position signal input unit contacts the first polarizer 113. For example, a power supply PS provides a first current $I_A$ and a second current $I_B$ to first and second side portions of the transparent conductive layer 115, respectively. A first voltage $V_A$ is measured at the first side portion of the transparent conductive layer 115. A second voltage $V_B$ is measured at the second side portion of the transparent conductive layer 115. Such a change in the electrical load is measured through a conversion circuit including an analog-to-digital (A/D) converter, so that a contact position of the position signal input unit is detected.

Figure 3:
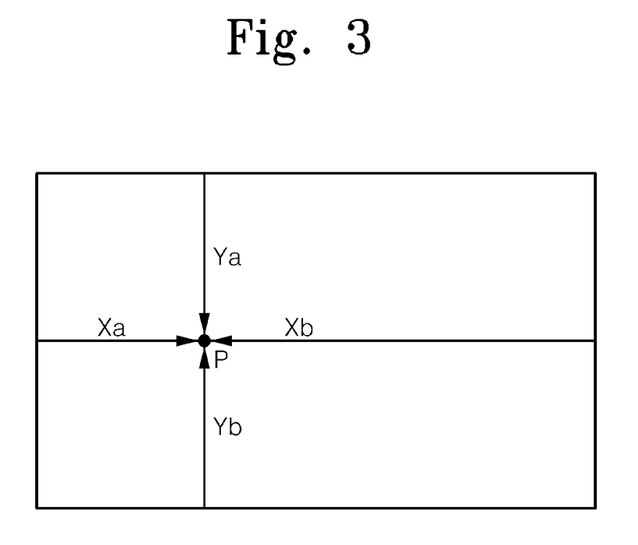
FIG. 3 is a view showing a method of detecting a contact position of a position signal input unit through a 4-edge detection scheme.
Figure 4:
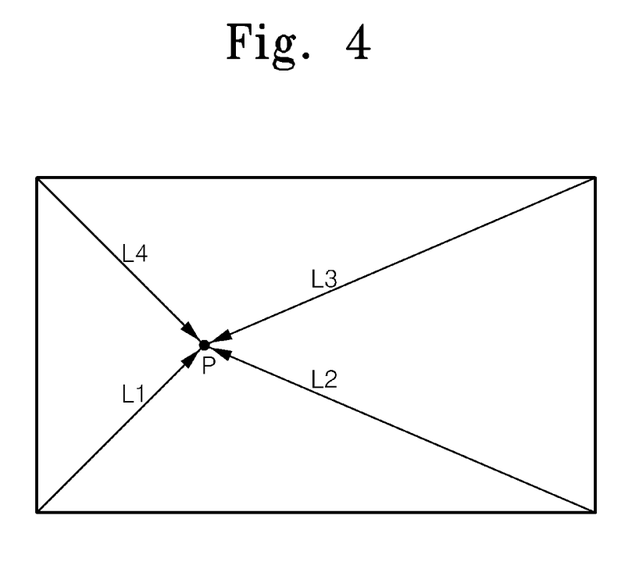
FIG. 4 is a view showing a method of detecting a contact position of a position signal input unit through a 4-corner detection scheme.

A 4-edge detection scheme and a 4-corner detection scheme may be used to detect the contact position of the position signal input unit. As shown in FIG. 3, according to the 4-edge detection scheme, distances Xa, Xb, Ya, and Yb from four edges of the first polarizer 113 to the contact point P of the position signal input unit are detected, and then a position of the contact point P of the position signal input unit is obtained using the detected values. As shown in FIG. 4, according to the 4-corner detection scheme, distances L1, L2, L3, and L4 from four corners of the first polarizer 113 to the contact point P of the position signal input unit are detected, and then a position of the contact point P of the position signal input unit is obtained using the detected values.

A linear pattern 117 is formed on a surface of the transparent conductive layer 115 so that the electric field formed on the first polarizer 113 is uniformly distributed. The linear pattern 117 is formed at an edge of the surface of the transparent conductive layer 115 and may include silver, gold, copper, aluminum, or an alloy thereof. If the linear pattern 117 is employed, a voltage may be uniformly applied to the linear pattern 117 when the position detection signal is applied to the transparent conductive layer 115, so that a uniform electric field is formed over the first polarizer 113, thereby enabling precise detection of the contact position.

An antistatic electrode 119, which removes noise that may degrade the sensitivity of the touch sensor, and the transparent conductive layer 115 are formed on opposite sides of the first insulating substrate 111. The antistatic electrode 119 may include ITO, IZO, or a mixture thereof, and may be formed through sputtering or CVD.

The lower substrate 120 includes a second insulating substrate 121, a second polarizer 123, a thin film transistor layer 125, a color filter 127, and an electrode layer 129.

The second polarizer 123 is formed on an opposite side of the second insulating substrate 121 than the thin film transistor layer 125 and the color filter 127. The second insulating substrate 121 and the second polarizer 123 may be formed using the same material and process used to form the first insulating substrate 111 and the first polarizer 113, which were previously described.

The thin film transistor layer 125 provides a data signal to a pixel electrode, which is formed on the electrode layer 129, which will be described below, in response to a gate signal. To this end, the thin film transistor layer 125 includes a gate electrode connected to gate line that provides the gate signal, a source electrode connected to a data line that provides the data signal, a drain electrode connected to a pixel electrode, an active layer that overlaps the gate electrode with a gate insulating layer therebetween to form a channel between the source electrode and the drain electrode, and an ohmic contact layer that allows the active layer to realize an ohmic contact with respect to the source electrode and the drain electrode.

The pixel electrode is formed on the electrode layer 129. The pixel electrode forms an electric field in the liquid crystal layer 130 corresponding to a potential difference between a pixel voltage and a common voltage applied to the pixel electrode and a common electrode, respectively, so that light transmittance of the liquid crystal layer 130 may be adjusted. The common electrode may be horizontally formed on the electrode layer 129 of the lower substrate 120 similarly to a plane to line switching (PLS) mode liquid crystal display, a fringe field switching (FFS) mode liquid crystal display, and an in-plane switching (IPS) mode liquid crystal display. In addition, the common electrode may be formed on a lower part of the first insulating substrate 111 of the upper substrate 110.

Hereinafter, a liquid crystal display according to another exemplary embodiment will be described with reference to FIG. 5 and FIG. 6.

Figure 5:
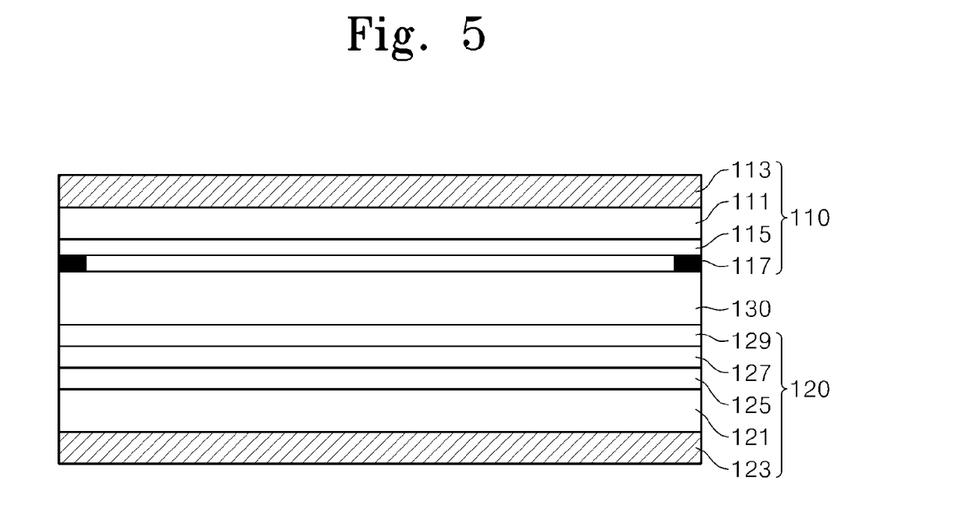
FIG. 5 is a sectional view showing a touch screen panel type liquid crystal display according to another exemplary embodiment of the present invention.
Figure 6:
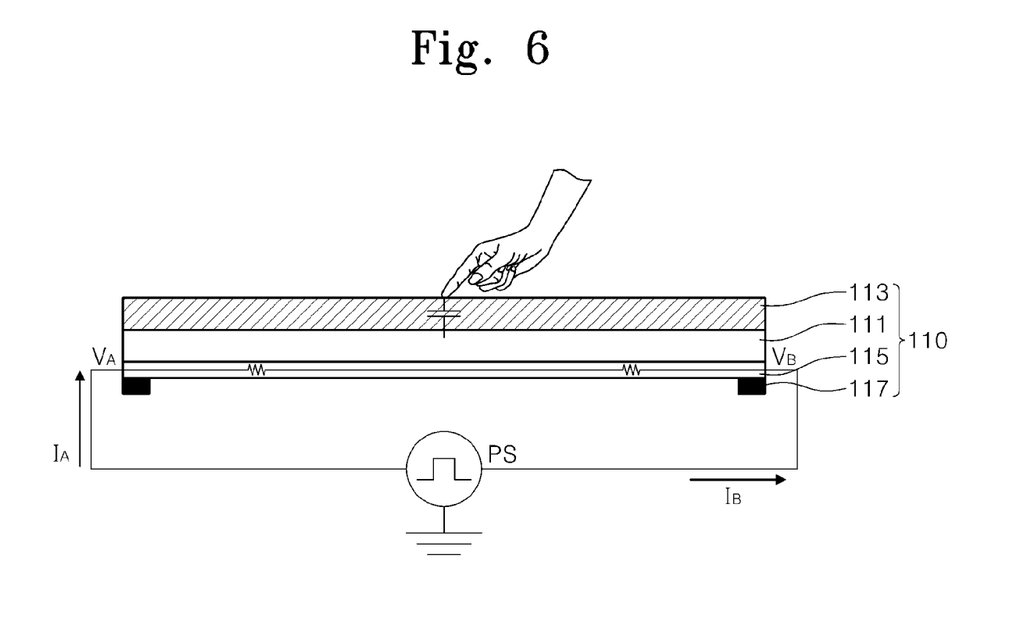
FIG. 6 is a view showing an operational principle of the touch screen panel type liquid crystal display according to the exemplary embodiment of FIG. 5.

FIG. 5 is a sectional view showing a touch screen panel type liquid crystal display according to another exemplary embodiment of the present invention. FIG. 6 is a view showing an operational principle of the touch screen panel type liquid crystal display according to the exemplary embodiment of shown in FIG. 5.

A liquid crystal display according to the present exemplary embodiment includes an upper substrate 110, a lower substrate 120, and a liquid crystal layer 130 between the upper and lower substrates 110 and 120. Similarly to the liquid crystal display described in FIG. 1 and FIG. 2, the liquid crystal display according to the present exemplary embodiment does not require an additional touch screen panel because the upper substrate 110 may serve as the touch screen panel.

The liquid crystal display according to the present exemplary embodiment is different from the liquid crystal display described in FIG. 1 and FIG. 2 in that a transparent conductive layer 115 of the upper substrate 110 is formed on a lower part of the first insulating layer 111 such that a first polarizer 113 and a first insulating substrate 111 form a parasitic capacitance while serving as a dielectric layer.

The liquid crystal display according to the present exemplary embodiment is suitable when electronic noise, which may degrade the sensitivity of a touch sensor, is weak. That is, the liquid crystal display is suitably used when a conductive film having low surface electrical resistance is formed to shield electromagnetic waves discharged from the liquid crystal display, an electrode line for electromagnetic interference (EMI) is disposed on an EMI conductive surface to remove the electric load and magnetic load, and the EMI effect is increased through earth grounding.

Since the transparent conductive layer 115 is disposed on a lower surface of the first insulating substrate 111, the first insulating substrate 111 may have a thickness of about 0.01 mm to about 5 mm in order to prevent the signal from getting weak. In addition, the first insulating substrate 111 may include a polymer material, such as polycarbonate, polyethyleneterephthalate, polymethylmethacrylate, or polyethersulfone, having flatness characteristics.

The liquid crystal display according to the exemplary embodiments may be used for a PLS mode liquid crystal display, an FFS mode liquid crystal display, or an IPS mode liquid crystal display. Accordingly, a thickness of the liquid crystal display may be effectively reduced, the occurrence of a Newton ring may be prevented, and light transmittance may be enhanced. In addition, even if a surface of the polarizer of the upper substrate is scratched, contact detection may be properly performed and optical characteristics, such as minimum reflection, may be obtained.

Hereinafter, a liquid crystal display according to another exemplary embodiment will be described with reference to FIG. 7 and FIG. 8.

Figure 7:
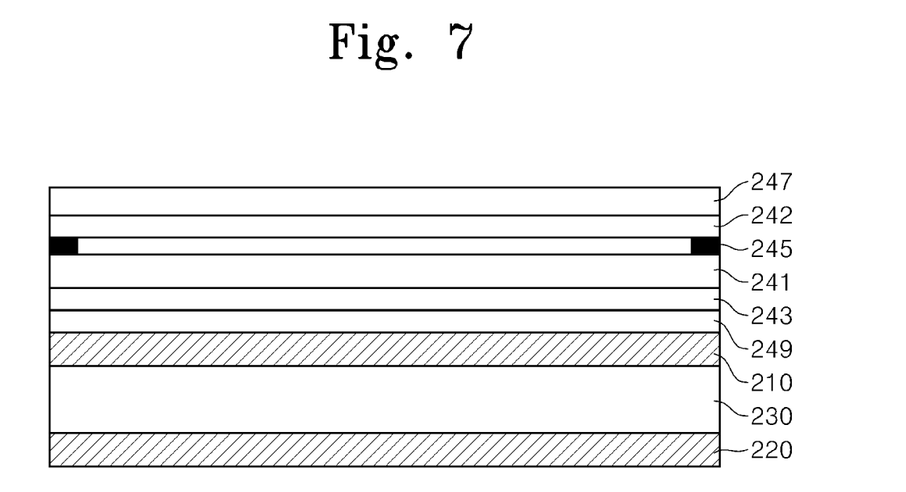
FIG. 7 is a sectional view showing a touch screen panel type liquid crystal display according to another exemplary embodiment of the present invention.

FIG. 7 is a sectional view showing a touch screen panel type liquid crystal display according to another exemplary embodiment of the present invention. FIG. 8 is a view showing an operational principle of the touch screen panel type liquid crystal display according to the exemplary embodiment of FIG. 7. Different from the liquid crystal displays described in FIG. 1 and FIG. 5, the touch screen panel type liquid crystal display according to the present exemplary embodiment and other exemplary embodiments to be described below has a structure in which an additional touch screen panel is combined with a liquid crystal display panel.

The liquid crystal display according to the present exemplary embodiment includes a liquid crystal display panel including a lower substrate 220, an upper substrate 210, and a liquid crystal layer 230, a transparent polymer layer 241, a transparent conductive layer 242, and an overcoat layer 247.

The transparent polymer layer 241 is formed on the liquid crystal display panel and may include a transparent polymer material, for example, polycarbonate, polyethyleneterephthalate, polymethylmethacrylate, or polyethersulfone. If the transparent polymer layer 241 is used instead of glass, visibility may be improved since the transparent polymer layer 241 has a refractive index similar to that of other layers including the transparent conductive layer 242. The transparent polymer layer 241 may have a thickness of about 0.01 mm to about 5 mm in consideration of hardness and transmittance of the transparent polymer layer 241.

The transparent conductive layer 242 is formed on the transparent polymer layer 241 and may include ITO, IZO, or a mixture thereof. The transparent conductive layer 242 may be formed through sputtering or CVD.

The overcoat layer 247 is formed on the transparent conductive layer 242 and may include a transparent conductive material, such as $SiO_2$. The overcoat layer 247 is a dielectric layer that serves as a touch sensor by forming a parasitic capacitance.

Figure 8:
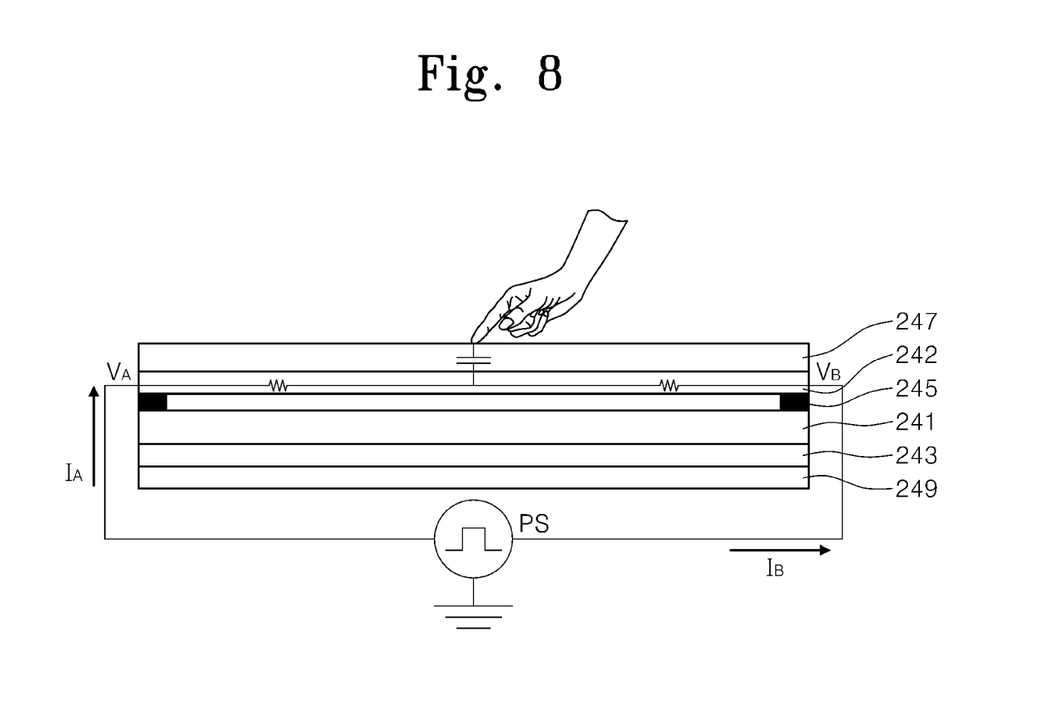
FIG. 8 is a view showing an operational principle of the touch screen panel type liquid crystal display according to the exemplary embodiment of FIG. 7.

As shown in FIG. 8, if the position detection signal is applied to the transparent conductive layer 242, an electric field is formed on the overcoat layer 247. At this time, if a position signal input unit, such as a pen or a finger, contacts the overcoat layer 247, electric charges in the parasitic capacitance are absorbed by the position signal input unit, so that the electrical load may be changed. Accordingly, a contact position of the position signal input unit may be detected through a conversion circuit including an A/D converter.

A cushion layer 249 is formed opposite the transparent conductive layer 242 with the transparent polymer layer 241 therebetween to absorb impact. The cushion layer 249 may have a thickness of about 0.01 mm to about 5 mm in consideration of impact absorption performance and light transmittance of the cushion layer 249. The cushion layer 249 may include silicon, thermosetting resin, or photo-curable resin. In order to cure the thermosetting resin, the thermosetting resin may be heated to a temperature in the range of about 30° C. to about 300° C. In order to cure the photo-curable resin, ultraviolet rays may be irradiated onto the photo-curable resin in a range of 2,000 mj/cm$^2$ to 5,000 mj/cm$^2$. A linear pattern 245 is formed on a surface of the transparent conductive layer 242 such that the electric field formed on the transparent polymer layer 241 is uniformly distributed. The linear pattern 245 is formed at an edge of the surface of the transparent polymer layer 241 and may include silver, gold, copper, aluminum, or an alloy thereof. If the linear pattern 245 is used, when the position detection signal is applied to the transparent polymer layer 241, a uniform voltage is applied to the linear pattern 245, so that a uniform electric field is formed over the overcoat layer 247, which may enable precise detection of the contact position.

An antistatic electrode 243 is formed opposite the transparent conductive layer 242 with the transparent polymer layer 241 therebetween to remove noise that degrades the sensitivity of the touch sensor. The antistatic electrode 243 may include ITO, IZO, or a mixture thereof, and may be formed through sputtering or CVD. The arrangement between the antistatic electrode 243 and the cushion layer 249 is not limited. That is, as shown in FIG. 7 and FIG. 8, the antistatic electrode 243 may be formed between the cushion layer 249 and the transparent polymer layer 241. According to another exemplary embodiment, the cushion layer 249 may be formed between the antistatic electrode 243 and the transparent polymer layer 241.

According to the present exemplary embodiment, a 4-edge detection scheme and a 4-corner detection scheme may be used to detect the contact position of the position signal input unit.

Hereinafter, a liquid crystal display according to another exemplary embodiment will be described with reference to FIG. 9 and FIG. 10.

Figure 9:
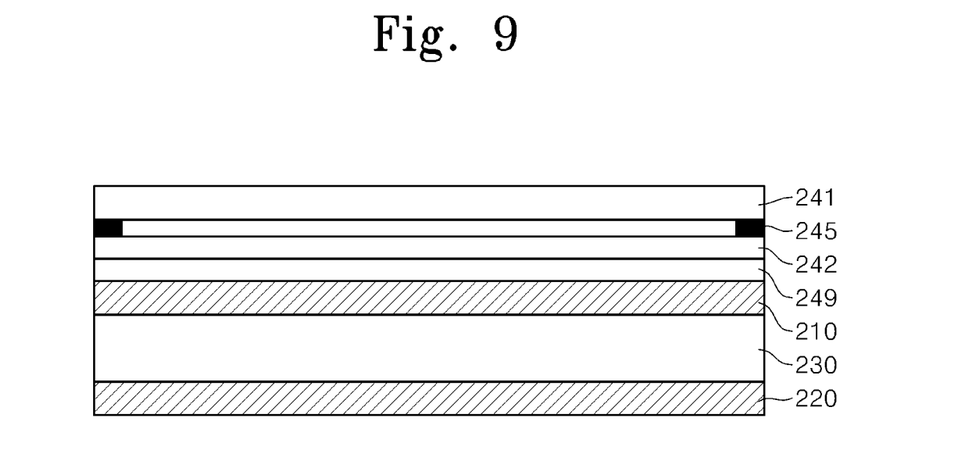
FIG. 9 is a sectional view showing a touch screen panel type liquid crystal display according to another exemplary embodiment of the present invention.
Figure 10:
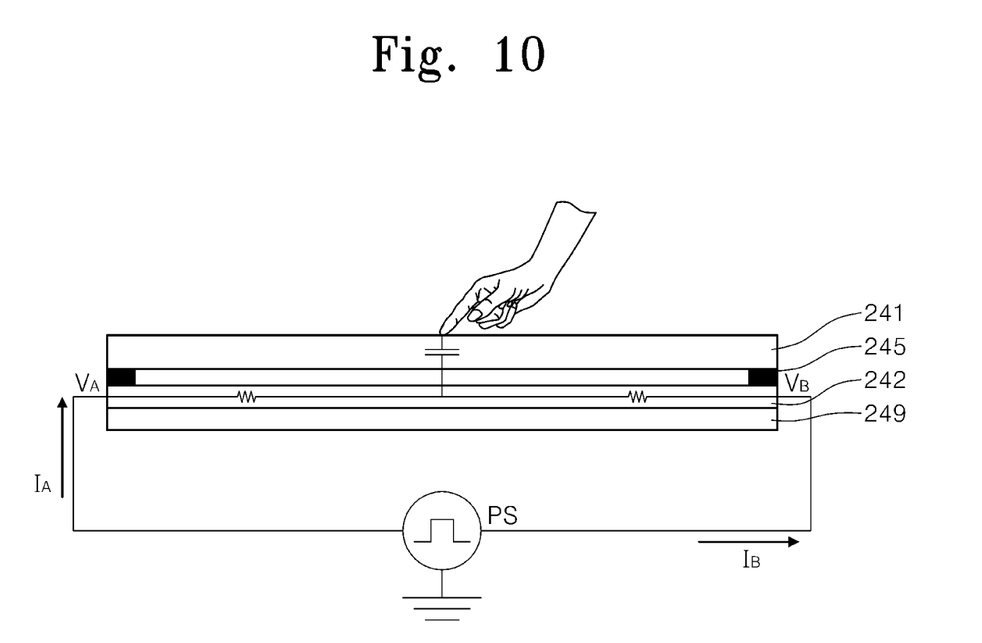
FIG. 10 is a view showing an operational principle of the touch screen panel type liquid crystal display according to the exemplary embodiment of FIG. 9.

FIG. 9 is a sectional view showing a touch screen panel type liquid crystal display according to another exemplary embodiment of the present invention. FIG. 10 is a view showing an operational principle of the touch screen panel type liquid crystal display according to the exemplary embodiment of FIG. 9.

A liquid crystal display according to the present exemplary embodiment includes a liquid crystal display panel including an upper substrate 210, a lower substrate 220, and a liquid crystal layer 230, a cushion layer 249 formed on the liquid crystal display panel, a transparent conductive layer 242 formed on the cushion layer 249, and a transparent polymer layer 241 formed on the transparent conductive layer 242.

The liquid crystal display according to the present exemplary embodiment is different from the liquid crystal display described in FIG. 7 and FIG. 8 in that the transparent conductive layer 242 is disposed on a lower part of the transparent polymer layer 241 such that the transparent conductive layer 241 forms a parasitic capacitance while serving as a dielectric layer. That is, the transparent polymer layer 241 serves as a touch sensor to detect a contact position of a position signal input unit.

Hereinafter, a liquid crystal display according to another exemplary embodiment will be described with reference to FIG. 11 and FIG. 12.

Figure 11:
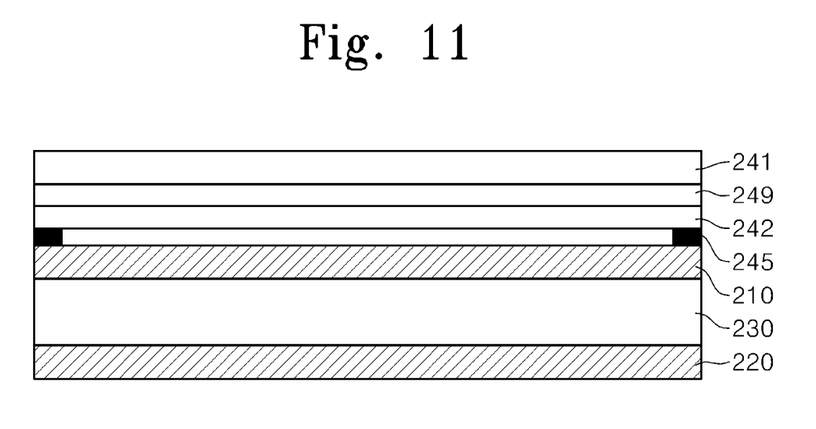
FIG. 11 is a sectional view showing a touch screen panel type liquid crystal display according to another exemplary embodiment of the present invention.
Figure 12:
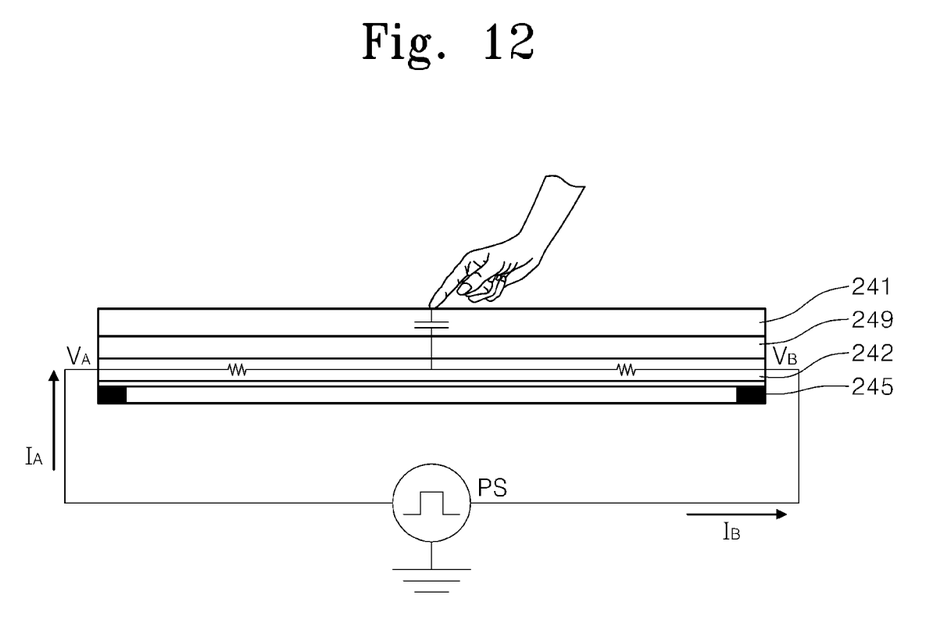
FIG. 12 is a view showing an operational principle of the touch screen panel type liquid crystal display according to the exemplary embodiment of FIG. 11.

FIG. 11 is a sectional view showing another exemplary embodiment of a touch screen panel type liquid crystal display according to the another exemplary embodiment of the present invention. FIG. 12 is a view showing an operational principle of the touch screen panel type liquid crystal display according to the exemplary embodiment of FIG. 11.

A liquid crystal display according to the present exemplary embodiment includes a liquid crystal display panel including an upper substrate 210, a lower substrate 220, and a liquid crystal layer 230, a transparent conductive layer 242 formed on the liquid crystal display panel, a cushion layer 249 formed on the transparent conductive layer 242, and a transparent polymer layer 241 formed on the cushion layer 249.

The liquid crystal display according to the present exemplary embodiment is different from the liquid crystal display described in FIG. 9 in that the transparent conductive layer 242 is disposed below the transparent polymer layer 241 and the cushion layer 249 such that the transparent conductive layer 241 and the cushion layer 249 form a parasitic capacitance while serving as a dielectric layer. That is, the transparent polymer layer 241 serves as a touch sensor to detect a contact position of a position signal input unit.

As described above, the liquid crystal display may be used for a panel structure of a PLS mode liquid crystal display, an FFS mode liquid crystal display, or an IPS mode liquid crystal display, in which an electrode including ITO is not deposited on an upper plate, so that the thickness of the liquid crystal display may be effectively reduced, the occurrence of the Newton ring phenomenon may be prevented, and light transmittance may be enhanced.

Also, even if a finger is used as the position signal input unit, electric current flowing through the finger ranges from about 10 μA to about 20 μA, which is less than one-fifth of the electric current flowing through a hand in contact with a battery, so the electric current rarely exerts bad influence upon the human body.

Also, static electricity or electromagnetic waves discharged to the inner side of the liquid crystal display are grounded to a conductive layer, so that the static electricity remaining on a touch screen may be removed and dust may be prevented from sticking to the touch screen.

Further, even if a scratch is formed on a surface of a polarizer of an upper substrate serving as a touch sensor, contact detection may be properly performed and optical characteristics, such as minimum reflection, may be obtained. Also, the rework efficiency may be improved and the manufacturing cost may be substantially reduced by simplifying the manufacturing process and reducing the cost for raw materials.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A touch screen panel type liquid crystal display, comprising:
    an upper substrate comprising a first insulating substrate, a transparent conductive layer on the first insulating substrate, and a first polarizer on the transparent conductive layer, the transparent conductive layer configured to receive a position detection current to form a capacitance with a position signal input unit, and the first polarizer configured to serve as a dielectric between the transparent conductive layer and the position signal input unit;
    a lower substrate comprising a second insulating substrate, a second polarizer on the second insulating substrate, and a thin film transistor layer, the second insulating substrate being between the thin film transistor layer and the second polarizer;
    a liquid crystal layer between the upper substrate and the lower substrate;
    a signal detection unit configured to measure first and second voltages at first and second side portions, respectively, of the transparent conductive layer, to thereby detect a contact position of the position signal input unit on the first polarizer based on a change in electrical load at the contact position through a conversion circuit caused by an absorption of electrical charges by the position signal input unit; and
    a linear pattern at one surface of the transparent conductive layer to uniformly distribute an electric field on the first polarizer,
    wherein the linear pattern is configured to receive a voltage when a position detection signal is applied to the transparent conductive layer.

2. The touch screen panel type liquid crystal display of claim 1, wherein the linear pattern comprises one material selected from the group consisting of silver, gold, copper, aluminum, and an alloy comprising at least two of silver, gold, copper, and aluminum.

3. The touch screen panel type liquid crystal display of claim 1, wherein the upper substrate further comprises an antistatic electrode, the first insulating substrate being between the antistatic electrode and the transparent conductive layer.

4. The touch screen panel type liquid crystal display of claim 1, wherein the signal detection unit is configured to detect the contact position of the position signal input unit through a 4-edge detection scheme or a 4-corner detection scheme.

5. The touch screen panel type liquid crystal display of claim 1, wherein the transparent conductive layer comprises a transparent conductive material selected from the group consisting of indium tin oxide, indium zinc oxide, and a mixture of indium tin oxide and indium zinc oxide.

6. A touch screen panel type liquid crystal display, comprising:
    an upper substrate comprising a first insulating substrate, a first polarizer on the first insulating substrate, and a transparent conductive layer, the first insulating substrate being between the transparent conductive layer and the first polarizer, the transparent conductive layer configured to receive a position detection current to form a capacitance with a position signal input unit, and the first polarizer configured to serve as a dielectric between the transparent conductive layer and the position signal input unit;
    a lower substrate comprising a second insulating substrate, a second polarizer on the second insulating substrate, and a thin film transistor layer, the second insulating substrate being between the thin film transistor layer and the second polarizer;
    a liquid crystal layer between the upper substrate and the lower substrate;
    a signal detection unit configured to detect measure first and second voltages at first and second side portions, respectively, of the transparent conductive layer, to thereby detect a contact position of the position signal input unit on the first polarizer based on a change in electrical load at the contact position through a conversion circuit caused by an absorption of electrical charges by the position signal input unit; and
    a linear pattern at one surface of the transparent conductive layer to uniformly distribute an electric field on the first polarizer,
    wherein the linear pattern is configured to receive a voltage when a position detection signal is applied to the transparent conductive layer.

7. The touch screen panel type liquid crystal display of claim 6, wherein the linear pattern comprises one material selected from the group consisting of silver, gold, copper, aluminum, and an alloy including at least two of silver, gold, copper, and aluminum.

8. The touch screen panel type liquid crystal display of claim 6, wherein the first insulating substrate has a thickness in the range of 0.01 mm to 5 mm.

9. The touch screen panel type liquid crystal display of claim 6, wherein the first insulating substrate comprises at least one polymer material selected from the group consisting of polycarbonate, polyethyleneterephthalate, polymethylmethacrylate, and polyethersulfone.

10. The touch screen panel type liquid crystal display of claim 6, wherein the signal detection unit is configured to detect the contact position of the position signal input unit through a 4-edge detection scheme or a 4-corner detection scheme.

11. A touch screen panel type liquid crystal display, comprising:
   a liquid crystal display panel;
   a transparent polymer layer on the liquid crystal display panel;
   a transparent conductive layer on the transparent polymer layer;
   an overcoat layer on the transparent conductive layer, the overcoat layer comprising a transparent insulating material, the transparent conductive layer configured to receive a position detection current to form a capacitance with a position signal input unit, and the overcoat layer configured to serve as a dielectric between the transparent conductive layer and the position signal input unit;
   a signal detection unit configured to measure first and second voltages at first and second side portions, respectively, of the transparent conductive layer, to thereby detect a contact position of the position signal input unit on the overcoat layer based on a change in electrical load at the contact position through a conversion circuit caused by an absorption of electrical charges by the position signal input unit; and
   a linear pattern at one surface of the transparent conductive layer to uniformly distribute an electric field on the overcoat layer,
   wherein the linear pattern is configured to receive a voltage when a position detection signal is applied to the transparent conductive layer.

12. The touch screen panel type liquid crystal display of claim 11, wherein the overcoat layer comprises $SiO_2$.

13. The touch screen panel type liquid crystal display of claim 11, further comprising a cushion layer opposite the transparent conductive layer to absorb impact, the transparent polymer layer being between the cushion layer and the transparent conductive layer.

14. The screen panel type liquid crystal display of claim 13, wherein the cushion layer comprises silicon, thermosetting resin, or photo-curable resin.

15. The touch screen panel type liquid crystal display of claim 11, wherein the linear pattern comprises one material selected from the group consisting of silver, gold, copper, and aluminum, or an alloy including at least two of silver, gold, copper, and aluminum.

16. The touch screen panel type liquid crystal display of claim 11, further comprising an antistatic electrode, the transparent polymer layer being between the antistatic electrode and the transparent conductive layer.

17. The touch screen panel type liquid crystal display of claim 11, wherein
   the transparent polymer layer comprises at least one polymer material selected from the group consisting of polycarbonate, polyethyleneterephthalate, polymethylmethacrylate, and polyethersulfone.

* * * * *